United States Patent [19]
Suzuki et al.

[11] Patent Number: 4,619,716
[45] Date of Patent: Oct. 28, 1986

[54] METHOD OF BRAZING AN ALUMINUM MATERIAL

[75] Inventors: Kenichi Suzuki; Fusayoshi Miura, both of Aichi, Japan

[73] Assignee: Kabushiki Kaisha Toyota Chuo Kenkyusho, Japan

[21] Appl. No.: 659,423

[22] Filed: Oct. 10, 1984

[30] Foreign Application Priority Data

Oct. 13, 1983 [JP] Japan ................................ 58-191311
Nov. 7, 1983 [JP] Japan ................................ 58-208822
Dec. 9, 1983 [JP] Japan ................................ 58-233362
Dec. 16, 1983 [JP] Japan ................................ 58-238564
Jul. 31, 1984 [JP] Japan ................................ 59-162175
Aug. 14, 1984 [JP] Japan ................................ 59-170251
Aug. 20, 1984 [JP] Japan ................................ 59-173530

[51] Int. Cl.$^4$ ............................................. B23K 35/34
[52] U.S. Cl. ...................................... 148/26; 228/223
[58] Field of Search ............................ 148/23, 26, 24; 228/223

[56] References Cited

U.S. PATENT DOCUMENTS 3,951,328  4/1976  Wallace .................................. 148/23
4,070,192  1/1978  Arbib ..................................... 148/23
4,224,086  9/1980  Stokes .................................... 148/23

Primary Examiner—Peter D. Rosenberg
Attorney, Agent, or Firm—Berman, Aisenberg & Platt

[57] ABSTRACT

In a method of brazing aluminum material, the flux is formed on the surface of the aluminum material by a chemical conversion coating step. The aluminum material is brought into contact with a treating solution containing potassium and fluorine ions to cause a chemical reaction between aluminum components and potassium and fluorine ions, thereby forming $K_2AlF_5$. The $K_2AlF_5$ is present on the surface of the aluminum material as a uniform coating and acts as the flux during brazing. With the treating solution further containing zinc, the flux of $K_2AlF_5$ and a pitting corrosion inhibiting layer of metallic zinc are simultaneously formed. The treating solution may further include powdered $K_2AlF_5$ or $AlF_3$ to increase the amount of flux and thus to intensify the action of the flux. The chemical conversion coating may be applied either to the material to be brazed or to the material for brazing.

32 Claims, 9 Drawing Figures

METHOD OF BRAZING AN ALUMINUM MATERIAL

BACKGROUND OF THE INVENTION

1. Field of the Invention

This invention relates to a method of brazing desired parts of an aluminum material which comprises forming a flux layer composed of potassium pentafluoroaluminate ($K_2AlF_5$) on the surface of the aluminum material and thereafter heating.

2. Description of the Prior Art

Recently, aluminum material or an aluminum alloy material (hereinafter referred to as the aluminum material) has been used in heat exchangers, such as radiators for automobiles, due to the necessity of reducing the weight. In order to process the aluminum material into products, such as radiators etc., it is at least necessary to join said material with each other such material. The most suitable joining method is brazing because of good operational efficiency and the obtained joined form.

Heretofore, for brazing the aluminum material, there has mainly been used an Al-Si eutectic alloy having a melting point slightly lower than that of the aluminum material as a brazing alloy. Further, in order that the brazing alloy be well joined with the aluminum material, it is necessary to remove oxide films present on the surface of the aluminum material. In order to remove such films, a flux is applied to brazing parts together with the brazing alloy.

A most frequently used flux material is a mixture of metal chlorides such as $ZnCl_2$, $NaCl$, etc., containing fluorides. However, when a flux of said chloride substances is used, the flux remaining on the brazed part after a brazing operation can sometimes corrode the aluminum material or the brazing material. Therefore, it was necessary to remove the flux by washing the product after brazing.

On the other hand, it is known that potassium tetrafluoroaluminate ($KAlF_4$) is useful as a flux used for brazing the aluminum material. The $KAlF_4$ is a complex salt obtained by mixing and melting equimolar amounts of potassium fluoride (KF) and aluminum fluoride ($AlF_3$). Where this is used as a flux, it is pulverized and applied to brazing desired parts. This flux melts at a temperature of about 570° C., and removes or melts oxides present on the surface of the aluminum material, but it is inherently inactive to aluminum metal and therefore has excellent properties as a brazing flux. Said flux, even if remaining on the brazed part after brazing, is substantially insoluble in water and hence does not corrode the aluminum material.

Accordingly, it has advantages washing after brazing, otherwise required when a chloride flux is used, is unnecessary. Painting may also be provided without giving any special treatment to products, etc.

However, this flux has a drawback that the method of supplying said flux to the brazing part is complicated. In other words, as described above, the flux is a powder mainly composed of potassium tetrafluoroaluminate. As the method of applying this powder to the brazing part, there has been proposed a method which comprises firstly suspending this powder, and a powdered brazing alloy if needed, in water, immersing therein an assembly composed of the aluminum material before brazing, then picking up said assembly from the suspension after sufficient immersion, and drying, thereby depositing the flux, or the flux and the brazing alloy, on the brazing part.

Thereafter, said assembly is heated to a predetermined temperature to melt the flux and the brazing alloy, whereby the brazing alloy penetrates through the brazing part and, when cooled, said brazing part is joined by the brazing alloy. This method, however, has a disadvantage that, in order to supply the required amounts of the flux and the brazing alloy to the brazing part, it is necessary to finely adjust the amounts of the flux and the brazing alloy in the aqueous suspension, the pick-up speed and pick-up mode after immersion of the assembly, etc.

Further, since aluminum products obtained using the above-described brazing method, for example, radiators for automobiles, are subject to pitting corrosion due to chlorine resulting from deicing salt, sea salt, etc., and hence tend to form penetrated holes, it is necessary to prevent this. For that purpose, it is required to form a zinc or zinc alloy layer for forming a pitting corrosion inhibiting layer on the surface of the aluminum material to be used, beforehand in a separate step. That is, in order to produce aluminum products by brazing, there was a problem that a number of processing steps were required.

SUMMARY OF THE INVENTION

The present inventors have been intensively studying by focusing their interest on the drawbacks of the above-described conventional methods used for brazing the aluminum material, and finally have come to accomplish this invention.

An object of this invention is to provide a method of brazing which can form a flux layer firmly deposited on the surface of the aluminum material which is a material to be brazed, by chemical conversion coating, can easily effect brazing at the desired locality, and further, after brazing, does not give rise to corrosion due to the residue of the flux.

A further object of this invention is to provide a brazing method which comprises simultaneously forming a brazing flux and metallic zinc as a coating layer on the surface of the aluminum material, and thereafter joining a brazing desired part of said aluminum material to a counterpart member and at the same time forming a zinc diffusion layer on the surface of the aluminum material thereby effecting pitting corrosion inhibiting treatment.

Another object of this invention is to provide a brazing method which comprises applying an electric field to the surface of the aluminum material to effect electrolysis and to form a flux layer in a shorter time and thereafter effecting brazing.

Yet another object of this invention is to provide a brazing method which comprises supplying a powder of $K_2AlF_5$ or $AlF_3$ to the aforesaid chemical conversion coating layer to form a flux showing sufficient brazability and thereafter effecting brazing.

Still another object of this invention is to provide a brazing method which comprises supplying an appropriate amount of a $K_2AlF_5$ flux only to a brazing desired part of a material to be brazed and thereafter effecting brazing.

BRIEF DESCRIPTION OF THE DRAWINGS

FIGS. 2 to 9 show examples in accordance with this invention, in which FIG. 2 is a perspective view of a brazing test specimen produced by assembling the aluminum material subjected to a chemical conversion coating step; FIGS. 3 and 4 are perspective views showing brazed conditions of brazing test specimens; FIG. 5 is a perspective view showing a test specimen having a space in a brazing part; FIG. 6 is a view showing that a brazing alloy sheet 30 having flux 5 formed on both sides thereof is sandwiched between an aluminum alloy sheet 15 and an aluminum alloy corrugated sheet 20; FIG. 7 is a perspective view showing the alluminum alloy corrugated sheet 20 to be brazed; FIG. 8 is a plan view of a preassembly; and FIG. 9 is a perspective view of an assembly to be brazed.

DETAILED DESCRIPTION

Figure 1:
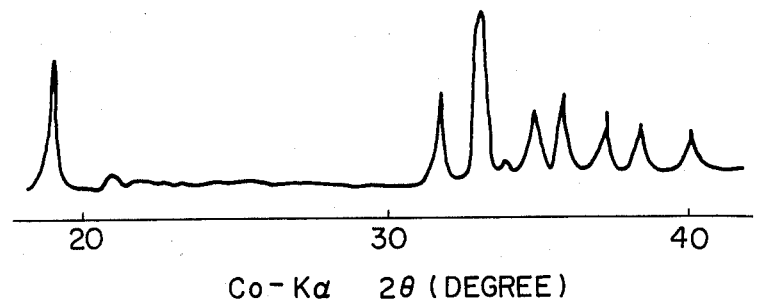
FIG. 1 shows an example of the X-ray diffraction pattern obtained from the surface of the chemical conversion coating layer obtained in this invention.

A method of brazing an aluminum material in accordance with the present invention comprises forming $K_2AlF_5$ as a flux by chemical conversion coating and joining a brazing desired part with a brazing alloy.

According to a first aspect of this invention, the method of brazing the aluminum material comprises a chemical conversion coating step of bringing at least a brazing desired part of the aluminum material into contact with a treating solution containing potassium and fluorine ions to form a brazing flux layer composed of potassium pentafluoroaluminate on the surface of said aluminum material and a brazing step of heating at least said flux layer formed part to a temperature of lower than the melting point of the aluminum material and higher than the melting point of the brazing alloy to join said aluminum material to a counterpart material with the brazing alloy.

As the treating solution used in the first aspect of this invention, the following (1)–(4) may be used.

Treating solution (1): Aqueous solution containing potassium and fluorine ions;

Treating solution (2): Aqueous solution containing potassium, fluorine and zinc ions (these ions will hereinafter be referred to merely as potassium, fluorine and zinc unless otherwise specified);

Treating solution (3): Aqueous solution of the aqueous solution (1) or (2) but further having a $K_2AlF_5$ powder suspended therein; and Treating solution (4): Aqueous solution of the aqueous solution (1) or (2) but further having an $AlF_3$ powder suspended therein.

The brazing alloy for joining the brazing desired part may either be supplied to the brazing desired part after the aforesaid chemical conversion coating step or be already clad on the surface of the aluminum material before applying the chemical conversion coating step.

According to the first aspect of this invention, by immersing the aluminum material in the treating solution containing potassium and fluorine (treating solution (1)), a flux layer can be easily formed and further the flow of the brazing alloy on brazing by the subsequent brazing step is smooth, thereby the brazing alloy is uniformly spread over the brazing desired part.

As a result, a flawless brazed joint part may be formed with a smaller amount of the brazing alloy, and at the same time the brazed joint part will not be corroded even without washing the brazed part after brazing.

Furthermore, since the chemical conversion coating layer as a flux is firmly adhered to the aluminum material, the flux does not come off even when said aluminum material is subjected to sheet metal processing, etc., to produce parts. Therefore, even in brazing after processing, the brazing alloy can easily flow, thus giving a healthy brazed joint part.

Moreover, where an electric field is applied to cause electrolysis on formation of the flux layer, the flux forming rate is increased, whereby the chemical conversion coating step may be completed in a shorter time.

In addition, according to the first aspect of this invention, merely by bringing the aluminum material, i.e., a material to be brazed into contact with the treating solution containing potassium, fluorine and zinc (treating solution (2)), it is possible to simultaneously form $K_2AlF_5$, i.e., a brazing flux and metallic zinc for forming a pitting corrosion inhibiting layer on the surface of said aluminum material and form these as a coating layer. On formation of the coating layer, since the reaction between the aluminum in the aluminum material and the potassium, fluorine and zinc in the treating solution proceeds almost ideally, hydrogen etc. are hardly generated, and also the mist from the treating solution is not generated, and therefore the chemical conversion coating operation may be effected in a clean atmosphere. Further, the obtained brazed product has an excellent pitting corrosion inhibiting effect.

Still, according to the first aspect of this invention, merely by bringing the aluminum material into contact with the treating solution made from the aforesaid treating solution (1) or (2) by suspending a $K_2AlF_5$ powder therein (treating solution (3)), a chemical conversion coating layer composed of $K_2AlF_5$ or $K_2AlF_5$ and zinc is formed on the surface and at the same time since the "wettability" of the aluminum material with the treating solution is improved by said coating layer, the $K_2AlF_5$ powder deposits more easily on the brazing desired part of the aluminum material. Further, since the aforesaid chemical conversion coating layer acts as a flux on brazing, the flow of the brazing alloy is improved and accordingly there is less chance that a poorly brazed part, such as a brazing alloy lacking part, etc., is generated on the brazed joint part.

Still further, according to the first aspect of this invention, merely by bringing the aluminum material into contact with the treating solution made from the aforesaid treating solution (1) or (2) by suspending an $AlF_3$ powder therein (treating solution (4)), a chemical conversion coating layer composed of $K_2AlF_5$ or $K_2AlF_5$ and zinc is formed and at the same time since the "wettability" of the aluminum material with the treating solution is improved by said coating layer, the $AlF_3$ powder deposits more easily on the brazing desired part of the aluminum material. Further, since the aforesaid $K_2AlF_5$ chemical conversion coating layer contains $AlF_3$, the activity as the flux is further increased, and even where the amount of the $K_2AlF_5$ is small, there is less chance that a poorly brazed part such as a brazing alloy lacking part etc. is generated on the brazed joint part.

The first aspect of this invention is more particularly described below.

The chemical conversion coating step in this invention is a step of bringing the aluminum material into contact with any of the aforesaid treating solutions (1)–(4) in such manner as immersion, coating, spraying etc., to form a chemical conversion coating layer composed of potassium pentafluoroaluminate ($K_2AlF_5$) on the surface of said aluminum material.

In this invention, the aluminum material means an aluminum or aluminum alloy material. Examples of the aluminum alloy material include alloys containing at least one of such metals as silicon (Si), copper (Cu), manganese (Mn), zinc (Zn), titanium (Ti), chromium (Cr), zirconium (Zr), magnesium (Mg), etc. Specific examples thereof are aluminun alloy materials, such as AA 3003, 1050, 7072 alloys, etc. Further, as the aluminum alloy material, there may also be used that obtained from aluminum or the aforesaid aluminum alloy material by coating it with an alloy having a melting point of 10°–100° C. lower than the former, e.g. an Al - Si eutectic alloy containing 7–12% by weight of Si on the surface. More speficically, there may be used, for example, No. 12 brazing sheet (i.e. AA 3003 alloy with AA 4343 alloy clad on both sides thereof.)

The case where this chemical conversion coating step is effected with the treating solution (1) is described below. The treating solution (1) is a solution containing potassium and fluorine. When the aforesaid aluminum material is brought into contact with this solution, on the contact site, the potassium and fluorine in the treating solution and the aluminum in the aluminum material, i.e. a material to be treated, chemically react, and thus a $K_2AlF_5$ layer firmly bonded to the aluminum material is formed on the surface of said material. The $K_2AlF_5$ effectively acts as a flux for brazing in the subsequent brazing step.

What is important in this invention is that the aforesaid $K_2AlF_5$ layer has been formed by the reaction as described above.

There are some recommended methods for preparing the aforesaid treating solution used in this step.

One of those is a method of dissolving the aforesaid potassium hydrogenfluoride ($KHF_2$) in water. The amount of $KHF_2$ dissolved is preferably 0.01 to 1 mole per liter of water for producing $K_2AlF_5$. If the amount of the $KHF_2$ is less than 0.01 mole/, the forming rate of the $K_2AlF_5$ chemical conversion coating layer is low and hence it takes a longer time for the formation of the desired amount of the $K_2AlF_5$. On the other hand, if more than1 mole/l is used, since the concentration of the solution is so high that $K_3AlF_6$ tends to be formed and thus it is impossible to efficiently obtain the $K_2AlF_5$.

Another method of preparing said treating solution is to dissolve potassium fluoride (KF) and hydrogen fluroide (HF) in water to prepare a mixed aqueous solution. Alternatively, this may also be a solution obtained by dissolving potassium hydroxide (KOH) and hydrogen fluoride in water.

These aqueous solutions are preferably such that the molar ratio of the fluorine to potassium contained in said aqueous solutions is 1–10 and the potassium is contained in an amount of 0.01–1 mole/l. If the aforesaid molar ratio exceeds 10, the aluminum material is etched to a greater extent and hence the surface is roughened, and therefore this is not preferable. On the contrary, if the molar ratio is less than 1, it is difficult to form the $K_2AlF_5$.

The reason why these treating solutions are mixed aqueous solutions of potassium fluoride or potassium hydroxide and hydrogen fluoride is that the addition of the fluorine increases the molar ratio of the fluorine and also promotes the reaction with the aluminum by making the treating solution acidic.

As the method of bringing the aforesaid aluminum material and the treating solution in contact with each other, in addition to the above-described method of immersing the aluminum material, there is a method of coating or spraying on at least a brazing desired part of the aluminum material. On this occasion, it is necessary to supply a considerably large amount so that the potassium and fluorine in the treating solution be not short.

Although the time for contact between said aluminum material and said treating solution cannot be determined unconditionally because it depends on the concentrations of the potassium and fluorine in the treating solution and the temperature of the treating solution, it is, for example, preferably in the range of about 0.5 sec to 20 min.

Since said treating solution is a solution in a form where the KF and HF are mixed, by said contact, the oxide film present on the surface of the aluminum material is destroyed and the aluminum, potassium and fluorine chemically react to form $K_2AlF_5$ Said formation of the $K_2AlF_5$ varies also depending on the temperature of the treating solution. Naturally, the chemical reaction can proceed at normal temperature. However, if the temperature of the treating solution is raised to 40°–70° C., especially the removal of the oxide film is effected completely and yet rapidly. As a result, the $K_2AlF_5$ is gradually formed as a firm chemical conversion coating layer on the surface of the aluminum material.

These materials may be subjected to the aforesaid chemical conversion coating step as such in the form of a material, or they may be subjected to this step after processed into a predetermined form or after assembling. The surface of said aluminum material may be degreased before the chemical conversion coating step by using an organic solvent such as trichloroethylene. Further, the oxide coating may be removed beforehand by using e.g. hydrogen fluoride. Thus, the surface of said aluminum material may be cleaned before the chemical conversion coating step.

Further, this chemical conversion coating step may also be conducted by arranging counter electrodes in the aforesaid treating solution and applying a voltage across said counter electrodes and the aluminum material. In this case, the materialfor the counter electrodes is preferably a material which does not dissolve in the treating solution is ions, for example, carbon, platinum etc.

The aforesaid voltage to be applied may be either direct or alternating voltage. The case where a direct voltage is applied is described. According to a first method of applying a direct voltage, the arrangement is such that the aluminum material be of a positive voltage and the counter electrodes of a negative voltage. Although the intensity of the electric field to be generated between the aluminum material and the counter electrodes is not particularly restricted, it is preferred to apply a voltage so that the current density on the surface of the aluminum material be 0.2– 1 $A/dm^2$.

Although the forming mechanism of the chemical conversion coating layer on the surface of the aluminum material is not clarified, it is presumed as follows: First, the aluminum material immersed in the aforesaid treating solution undergoes destruction of the oxide film present on its surface. Then, when a voltage is applied to the aluminum material, $Al^{3+}$ ions are generated by a reaction of $Al \rightarrow Al^{3+} + 3e$. Thereafter, said $Al^{3+}$ ions react with $K^+$ and $F^-$ ions in the treating solution to form $K_2AlF_5$. Thus, the $K_2AlF_5$ is formed as a chemical conversion coating on the surface of the aluminum material. On the other hand, a hydrogen gas is generated from the counter electrodes. In addition, also by reversely applying a voltage, the $K_2AlF_5$ may be produced in a large amount.

According to a second method of applying a direct voltage, the polarity is changed during application of voltage. First, a voltage is applied so that the aluminum material be of a negative voltage. Then, the oxide film of the surface of the aluminum material more rapidly undergoes decomposition and is removed to partially form $K_2AlF_5$ When the oxide film has sufficiently been removed, the polarity of the voltage is reversed, and then the aforesaid first step is effected.

By this second method, it is possible to efficiently and yet completely remove the oxide film, and therefore the formed chemical conversion coating layer of the $K_2AlF_5$ is more firmly adhered to the aluminum material.

In this second method, when the aluminum material is used as the aforesaid counter electrodes, it is possible to form a chemical conversion coating layer of the $K_2AlF_5$ on the surface of the aluminum material on the positive voltage side, while removing the oxide film on the surface of the aluminum material on the negative voltage side. Therefore, by replacing the aluminum material on the positive voltage side by a nontreated one and switching the polarity of the voltage, it is possible to successively effect the removal of the oxide film and the formation of the chemical conversion coating layer.

Next, the case where an alternating voltage is applied is described. An alternating voltage is applied across the aluminum material and the counter electrodes. The counter electrodes used in this case may be those produced from such material as carbon, platinum etc. as in the case described above, or may be the aluminum material as a material to be treated. In this method of applying an alternating voltage, when the aluminum material becomes under a negative voltage, the oxide film is mainly removed, and when it is under a positive voltage, the chemical conversion coating layer of $K_2AlF_5$ is formed. The once formed $K_2AlF_5$ does not dissolve again even when the aluminum material becomes under a negative voltage again and thus $K_2AlF_5$ is successively formed as the chemical conversion coating layer.

The formation of said $K_2AlF_5$ varies also depending on the temperature of the treating solution.. Naturally, the electrochemical reaction sufficiently proceeds at normal temperature. However, if the temperature of the treating solution is raised to 40°–70° C., especially the removal of the oxide film is effected completely and yet rapidly. The heating of the treating solution may be effected by the electric current of the applied voltage.

Thus, when an electric field is generated by applying a voltage across the aluminum material and the counter electrodes, not only the removal of the oxide film is facilitated but also there is manifested an effect that the forming rate of the chemical conversion coating layer of the $K_2AlF_5$ is increased and said coating layer is firmly adhered to the surface of the aluminum material.

When the $K_2AlF_5$ has been formed in an amount of 0.1 –10 g per $m^2$ of the surface area by contact of the aluminum material and the treating solution (1) with or without the application of an electric field, the contact of the aluminum material and the treating solution may be ceased.

At that time, the unreacted potassium and fluorine are still present on the surface of the aluminum material subjected to the aforesaid chemical conversion coating step. Said remaining potassium and fluorine may be washed away with water, or may be left as such because they do not interfere with the subsequent step.

In addition, said treated aluminum material may further be subjected to a drying step. The drying step is effected by evaporating the water remaining on the surface of the aluminum material. Where water washing is not conducted after the chemical conversion coating step, it is also possible, by this step, to react the potassium and fluorine remaining on the surface of the aluminum material with the aluminum to form more $K_2AlF_5$. However, if the remaining potassium and fluorine are too much, said potassium and fluorine become $KHF_2$, and the remaining water evaporates. As a result, water-free $KHF_2$ remains on the surface of the aluminum material. Since the $KHF_2$ has no hygroscopic nature and hence does not become sticky by spontaneously absorbing atmospheric moisture, handling of the material is easy and moreover no harm is brought about in the subsequent brazing.

As the specific means for drying, mere leaving in atmosphere is possible, but a relatively long time is required. Further, it can be effected by blowing a warm air of from normal temperature to 100° C. Alternatively, a hot air of 100°–200° C. may be blown. In particular, when a hot air is blown, the water content in the chemical conversion coating layer is lost and the chemical conversion coating layer is sintered onto the surface of the aluminum material, whereby said coating layer becomes even stronger. Further, there is an advantage that in the subsequent brazing step, water vapor is not generated and thus the dew point of the furnace atmosphere is not reaised and also a harmful fluorine vapor is not generated.

The aluminum material having the chemical conversion coating layer obtained as above should preferably have the $K_2AlF_5$ ring to the surface thereof in an amount of about 0.1–10 g/m$^2$ in order that the $K_2AlF_5$ act as the flux in the subsequent brazing step.

The case where this chemical conversion coating step is conducted using the treating solution (2) is described. The treating solution (2) is a solution containing potassium, fluorine and zinc.

There are some methods of preparing the aforesaid treating solution (2). One of those is a method which comprises dissolving potassium hydrogenfluoride ($KHF_2$) and zinq fluoride ($ZnF_2$) in water.

In order to form the $K_2AlF_5$ and make the amount of the metallic zinc optimum, it is preferable that the treating solution contain about 1–0.01 mole of $KHF_2$ and about 1–0.01 mole of $ZnF_2$ per liter. Further, it is preferred to make the hydrogen ion concentration of said treating solution acidic by adding HF. Thus, it is possible to dissolve a larger amount of zinc and prevent the zinc from becoming $KZnF_3$ and precipitating. Further, when the solution temperature is raised, the amount of the $ZnF_2$ added may be increased, but it is preferable that the molar ratio of the fluorine to potassium be in the range of 1–10. If the amount of the $KHF_2$ is less than 0.01 mole/l, the forming rate of the $K_2AlF_5$ is low, and it takes a prolonged time to form a desired amount of the $K_2AlF_5$. On the contrary, if it is more than 1 mole/l, since the solution concentration is high, $K_3AlF_6$ tends to easily form and thus it is difficult to efficiently obtain the $K_2AlF_5$. Further, if the $ZnF_2$ is less than 0.01 mole/l, the amount of the metallic zinc formed is small, and a zinc diffusion layer does not easily form after brazing. However, even if more than 0.16 mole/l is added, since it is not readily soluble at normal temperature, the amount of the zinc formed on the aluminum material in a constant period of time is not increased.

As another method of preparing said treating solution (2), potassium fluoride (KF), hydrogen fluoride (HF) and $ZnF_2$ may be dissolved in water. Alternatively, there may be used a method of dissolving potassium hydroxide (KOH), HF and zinc oxide (ZnO) in water. These aqueous solutions are preferably such that the molar ratio of the fluorine to potassium contained therein be 1-10 and the potassium be contained in an amount of 1-0.1 mole/l. If the aforesaid molar ratio exceeds 10, the aluminum material is etched to a greater extent and hence the surface ir roughened. On the contrary, if the molar ratio is less than 1, it is difficult to form the $K_2AlF_5$.

The more the amount of $Zn^{2+}$ ions, the more the metallic zinc formed in a constant period of time, and thus desirable. The reason why a mixed aqueous solution with the hydrogen fluoride is used is that by adding the fluorine, not only the molar ratio of the fluorine is increased but also the treating solution is made acidic to increase the amount of the zinc dissolved and at the same time facilitate the reaction with the fluorine, potassium and aluminum.

For bringing the aforesaid aluminum material and treating solution into contact with each other , there may be employed a simple method of immersing the aluminum material as mentioned above or a method of coating or spraying on at least those parts of the aluminum material where the pitting corrosion inhibiting layer is to be formed and brazing is desired. In the latte case, in order that the potassium and fluorine in the treating solution be not short, it is necessary to supply a relatively large amount thereof.

Since the treating solution is in a form in which the KF and HF are mixed, the oxide film present on the surface of the aluminum material is destroyed and the aluminum, potassium and fluorine chemically react to form the $K_2AlF_5$ and simultaneously the zinc in the solution is substituted by the aluminum to become metallic zinc and forms on the surface of the aluminum material as a coating layer. If the temperature of the treating solution is raised to 40°-70° C., the aforesaid reaction rapidly proceeds to give an even firmer coating layer.

The process of the above-described reaction may be presumed as follows:

When the aluminum material, which is a material to be treated, is immersed in the treating solution containing the potassium, fluorine and zinc, the zinc present as ions becomes metallic zinc by the substitution reaction with metallic aluminum and forms on the surface of the aluminum material. Further, the aluminum which has become ions by the substitution with the zinc in turn combines with the potassium and fluorine in the treating solution to form the $K_2AlF_5$ and firmly fix to the surface of the aluminum material together with the aforesaid metallic zinc.It is presumed that the surface of the aluminum material is divided into an anode part and a cathode part, and the above-described reaction proceeds in these parts.

That is, in the anode part:

$$2Al \rightarrow 2Al^{3+} + 6e \quad (1)$$

$$2Al^{3+} + 4K^+ + 10F^- \rightarrow 2K_2AlF_5 \quad (2)$$

in the cathode part:

$$3Zn^{2+} + 6e \rightarrow 3Zn \quad (3)$$

By combining the respective right sides and left sides of the equations (1), (2) and (3), the following is obtained:

$$3Zn^{2+} + 4K^+ + 10F^- + 2Al \rightarrow 3Zn + 2K_2AlF_5 \quad (4)$$

$Zn^{2+}$, $K^+$ and $F^-$ on the left side of the equation (4) represent the zinc, potassium and fluorine in the treating solution respectively; Al represents the aluminum in the aluminum material; and Zn and $K_2AlF_5$ on the right side represent the etalliczinc fixed to the surface of the aluminum material and the potassium pentafluoroaluminate as a brazing flux, respectively.

Since the aforesaid anode and cathode parts are finely distributed on the surface of the aluminum material, the formed metallic zinc and $K_2AlF_5$ are in finely dispersed conditions and thus are formed as an almost uniformly mixed coating layer.

In addition, in the aforesaid cathode part, hydrogen ions in the treating solution accept electrons (e) and are generated as hydrogen gas, but its amount is very small and therefore there is neither risk of danger nor generation of mist from the treating solution This is the difference from the case where the aforesaid treating solution (1) is used. Therefore, any apparatus for treating the hydrogen gas is,not required.

Thus, since in this step, the treating solution contains the potassium fluorine and zinc, it has an advantage that by a single step, the $K_2AlF_5$ as a brazing flux may be formed on the surface of the aluminum material and simultaneously the metallic zinc for forming a pitting corrosion inhibiting layer is formed by the substitution reaction..Further, sicne there is no generation of waste hydrogen gas, there is also an advantage that the processing apparatus may be simple.

By processing as described above, when desired amounts of the metallic zinc and $K_2AlF_5$ have been formed, the contact of said material and the treating solution may be ceased. Thereafter, a drying step may be added. The amounts of the etallic zincand $K_2AlF_5$ formed are preferably such that the metallic zinc be about 1.5 3 $g/m^2$ and the $K_2AlF_5$ be about 5-10 g per $m^2$ of thesurface area of the aluminum material in order to form a pitting corrosion inhibiting layer and form a perfect brazed joint part in the subsequent brazing step. The amounts of the metallic zinc and $K_2AlF_5$ more than the above ranges will not be an obstacle to brazing.

The aforesaid aluminum material subjected to the chemical conversion coating step using the aforesaid treating solution (1) or (2) may be in the form a sheet or mass, or may be that molded into parts of a desired form, e.g. parts of cooling water conduit cores and fins for automobile radiators, or even may be that made into a preassembly having a brazing desired part combined with a counterpart material.

Where the material as it is subjected to the chemical conversion coating step, said material may be processed into a desired form and made into a preassembly combined with a counterpart material. The counterpart material may be the aforesaid aluminum material provided with the chemical conversion coating or may be the aluminum material not provided with the chemical conversion coating. Further, it may also be that deposited with a flux by the conventional method. On processing said material, since the chemical conversion coating layer is firmly adhered to the aluminum material, it hardly flakes off. In particular, when the amount of the $K_2AlF_5$ deposited is 0.1–3 g/m$^2$, it does not break even if subjected to considerably severe processing. If the amount deposited exceeds 10 g/m$^2$, it sometimes breaks when bent at a larger curvature, and therefore care must be taken on processing.

In the aforesaid preassembly, the brazing desired part is a part where two or more members are to be assembled. This brazing desired part must be supplied with a brazing alloy before subjecting to the subsequent brazing step. As the method of supplying the brazing alloy, it is simple and thus preferable to employ a material clad with a brazing alloy for at least one of the members to be assembled. It is also possible to supply a brazing alloy in form of a stick, a wire or powder along the brazing desired part. The brazing alloy may be treated by the chemical conversion coating using the treating solution according to this invention to deposit $K_2AlF_5$ beforehand. In this case, since the flux has been adhered to both brazing alloy and member to be brazed, the flowability of the brazing alloy is improved and a normal brazed joint part is easily obtained.

The case where this chemical conversion coating step is conducted using the treating solution (3) is now described.

The aforesaid treating solution (3) is that containing fluorine and potassium and further suspending a $K_2AlF_5$ powder therein. In other words, this solution is that obtained by suspending the $K_2AlF_5$ powder in the aforesaid treating solution (1) or (2). Further, it is also possible to suspend a powdered brazing alloy therein. The $K_2AlF_5$ powder suspended in said treating solution may be from colloidal particles of about 0.1–0.5 μm in diameter up to a particle size like sand grains of about 1 mm. In particular, that of about 2–10 μm is prefrred from a viewpoint that the deposition on the brazing desired part is easy. The amount of said powder suspended is preferably about 20–80 g per liter of the solution. In this case, in order to improve the dispersibility of the $K_2AlF_5$ powder, an appropriate amount of a surface active agent may be added.

The synthesis of $K_2AlF_5$ may be effected by several processes, which are illustrated below.

One of those is a process which comprises adding an aluminum fluoride ($AlF_3$) powder to an aqueous solution of potassium fluoride (KF) and leaving at normal temperature for a prolonged time, or leaving at a temperature up to 100° C. for about an hour. The KF may contain as impurities small amounts of sodium fluoride (NaF), lithium fluoride (LiF), calcium fluoride, etc. In addition, it may also contain small amounts of alkali metals such as Cs, Rb, alkaline earth metals such as Ca, etc. There may be employed another method which comprises dissolving one mole of an aluminum salt such as aluminum hydroxide, etc. in an aqueous solution of either 5 moles of hydrogen fluoride (HF) or 2 moles of potassium hydroxide (KOH) and thereafter neutralizing with an aqueous solution of the other, whereby $K_2AlF_5$ is formed as fine particles in the mixed aqueous solution. The above-described methods are all by wet process, and have an advantage that procedures are very simple and operations such as heating etc. are not always necessary.

A material to be brazed is immersed in the treating solution prepared as above. Then, the oxide film present on the surface of the aluminum material as the material to be brazed is destroyed first, and the aluminum, potassium and fluorine chemically react to form a coating layer of $K_2AlF_5$. If the treating solution further contains zinc, a coating layer composed of $K_2AlF_5$ and zinc is formed. At the same time, the $K_2AlF_5$ deposits and accumulates on the brazing desired part, i.e. a part where the aluminum members are assembled. At that time, since the $K_2AlF_5$ coating layer has been formed on the surface of the aluminum material, the wettability with said treating solution is improved and also the surface is somewhat roughened, the $K_2AlF_5$ powder also easily deposits on the surface and also easily penetrates into a space in the brazing desired part.

When a sufficient amount of the $K_2AlF_5$ has been formed on the surface of the aluminum material and the $K_2AlF_5$ powder has satisfactorily penetrated into the brazing desired part, the material to be brazed is gently picked up from the treating solution. Thereafter, it is dried to remove the water content. On the surface of the material to be brazed is formed a coating layer composed of $K_2AlF_5$ by the chemical conversion coating and further the $K_2AlF_5$ powder suspended in the treating solution has deposited thereon.

That is, the surface of the aluminum material has been somewhat roughened due to the formation of the $K_2AlF_5$ by the chemical conversion coating and accordingly the suspended $K_2AlF_5$ powder easily deposits and thus it is possible to deposit a larger amount of the $K_2AlF_5$.

A brazing step is applied to the material to be brazed which has been subjected to the aforesaid immersing step. Where no brazing alloy is present on the brazing desired part, it is necessary to supply the brazing alloy. In this case, a preferred method of supplying the brazing alloy is, for example, to supply a stick-formed, wire-formed or powdered brazing alloy, e.g. an Al-Si eutectic alloy, along the brazing desired part. Said brazing alloy may be that previously subjected to the chemical conversion coating in this invention. Further, if the powdered brazing alloy is used, it is also possible to suspend it together with the $K_2AlF_5$ in the aforesaid aqueous suspension to prepare a mixture of the $K_2AlF_5$ powder and the brazing alloy and deposit it on the brazing desired part. The parts to be brazed in this case is preferably processed into desired forms and assembled prior to brazing.

The case where this chemical conversion coating step is conducted using the treating solution (4) is described below. The aforesaid treating solution (4) is that containing fluorine and potassium and further suspending an aluminum fluoride ($AlF_3$) powder therein. That is, the aforesaid treating solution (4) is the treating solution (1) or (2) but further having the $AlF_3$ powder suspended therein. Further, a powdered brazing alloy may also be suspended. The $AlF_3$ powder suspended in said treating solution may be from colloidal particles of about 0.1–0.5 μm in diameter up to particles of about 100μ. In particular, that of about 2–10 μm is preferable from a viewpoint that the deposition on the brazing desired part is easy. The amount of said powder suspended is preferably about 2–10 g per liter of the solution. In this case, in order to improve the the dispersibility of the $AlF_3$ powder, an appropriate amount of a surface active agent may be added.

A body to be brazed is immersed in the treating solution prepared as above. Then, the oxide film present on the aluminum material constituting the body to be brazed is destroyed, and the aluminum, potassium and fluorine chemically react to form a coating layer of $K_2AlF_5$ or a coating layer composed of $K_2AlF_5$ and zinc and at the same time AlF$_3$ deposits deposits on a brazing desired part which is a part where materials are combined, etc. At that time, since the coating layer of the K$_2$AlF$_5$ has been formed on the surface of the aluminum material and the wettability with said treating solution has been improved, the AlF$_3$ powder can easily deposit on the surface and also penetrate into a space in the brazing desired part of the aluminum material.

When a sufficient amount of the K$_2$AlF$_5$ has been formed on the surface of the aluminum material and the AlF$_3$ powder has sufficiently penetrated into the brazing desired part, the body to be brazed is gently picked up from the treating solution. Thereafter, it is dried to remove the water content. On the surface of the body to be brazed has been formed a coating layer composed of K$_2$AlF$_5$ by the chemical conversion coating and at the same time the AlF$_3$ powder suspended in the treating solution has deposited.

That is, the surface of the aluminum material has been somewhat roughened due to the formation of the K$_2$AlF$_5$ by the chemical conversion coating and accordingly the suspended AlF3 powder easily deposits.

The aluminum material subjected to the chemical conversion coating step using any of the treating solutions (1)–(4) described above and processed into a predetermined assembly, is heated by e.g. placing in a brazing furnace to effect the brazing step of the first aspect of this invention. The heating temperature is preferably lower than the melting point of the aluminum material but higher than the melting point of the brazing alloy.

The furnace atmosphere is most preferably a non-oxidizing atmosphere, but an atmosphere where a small amount of oxygen is present may suffice.

Although the detail for the phenomenon at the brazing part in the case where the aluminum material treated with the treating solution (1) is brazed has not been clarified, it may be conjectured as follows:

First, when the temperature rises to about 560° C. or above, K$_2$AlF$_5$, namely the flux, begins to melt. The melted flux reacts on the surface of the aluminum material, and the oxide film either generated during heating or present from the start is removed. Since the amount of the oxide film on the surface of the aluminum material subjected to the chemical conversion coating step is naturally small, even a small amount of the flux as in this invention is sufficient for removing the aforesaid oxide film.

Thereafter, the brazing alloy melts and comes into contact with the surface of the aluminum material. Since the aluminum material is now free from any oxide film and hence the wettability with the brazing alloy is improved, the brazing alloy penetrates into a space in the brazing part. The brazing alloy, when cooled after sufficient penetration into the brazing part, hardens and combines the aluminum material with each other to form a brazed joint part.

As has been described above, since the penetrating power of the brazing alloy is very strong, the brazing alloy forming the joint part does not easily give rise defects such as pinholes,etc. Further, although the flux residue is present on the brazed joint part or in its vicinity, this is substantially insoluble in water and therefore it does not corrode the aluminum material.

In addition, such a residue has more affinity with water, as compared with that of the aluminum material. Thus, for example, water condensed on a fin of a heat exchanger for an air-conditioner, can easily move to a water drip pan. As a result, the air flow in the narrow air passage in the heat exchanger is not interfered by the condensed water, and therefore heat exchange can be smoothly effected, thus bringing about such advantage as enhancement of the efficiency of said heat exchanger.

It is believed that also in the case where the aluminum material is treated with the treating solution (3) and where zinc is contained, brazing may be effected by a phenomenon similar to the above except that the amount of the K$_2$AlF$_5$ is larger.

Further, also in one case of the aluminum material treated with the solution (4), where zinc is not contained, it is believed that brazing is effected by a phenomenon similar to the above. In this case, in addition, the K$_2$AlF$_5$ and AlF$_3$ correlate with each other, and a flux action stronger than the case where the K$_2$AlF$_5$ is singly used is exhibited.

Furthermore, the case where the aluminum material is subjected to the chemical conversion coating step using the treating solution (2), (3) or (4) and where zinc is contained, is described.

By said brazing step, the brazing alloy melts and penetrates into a brazing desired part to form a brazed joint part, and at the same time, zinc diffuses from the surface of the aluminum material into the inside of said material to form a zinc diffusion layer as a pitting corrosion inhibiting layer.

The heating temperature in this brazing step is, since the melting point of the brazing alloy is generally higher than the melting point of zinc, preferably lower than the melting point of aluminum but higher than the melting point of the brazing alloy. The furnace atmosphere is most preferably a non-oxidizing atmosphere, but an atmosphere in which a small amount of oxygen is present may suffice.

Although the behaviors of the metallic zinc and K$_2$AlF$_5$ when subjected to this brazing step have not been clarified, When brazing is provided, the temperature of the preassembly rises. When it reaches about 420° C., the zinc fixed to the surface of the aluminum material begins to melt. When the temperature further rises to about 560° C., a part of the K$_2$AlF$_5$ starts to melt and reacts on the surface of the aluminum material, whereby the oxide film either generated during heating or present from the start is removed. Since the amount of the oxide film is naturally small after subjected to the chemical conversion coating step, a small amount of the K$_2$AlF$_5$ as in this invention is sufficient for removing the aforesaid oxid film. Further, the melted zinc diffuses from the surface of the aluminum material into the inside of said material, thereby forming a diffusion layer of zinc. Thereafter, the brazing alloy melts and comes into contact with the surface of the aluminum material. Since the aluminum material is now free from the oxide film, the wettability with the brazing alloy is improved and the brazing alloy penetrates into a space in the brazing part. At that time, the flowability of the brazing alloy is even enhanced by the presence of the zinc.

A part of the aforesaid melted zinc also diffuses through the brazing alloy. Therefore, when cooling is effected after the zinc has diffused to a predetermined level and the brazing alloy has sufficiently penetrated into the brazing part, the brazing alloy solidifies and the aluminum material combines with each other, i.e. with a counterpart material, thus forming a brazed joint part.

Although it is desired that the aforesaid zinc diffusion layer be of about 0.1 mm in thickness and the amount of the zinc contained on the surface be about 5% by weight, a pitting corrosion inhibiting effect may be manifested even with a content less than the above. The brazing alloy forming the brazed joint part of the obtained product is almost free from defects such as pinholes, etc. Further, even when said product undergoes a corrosion action by chloride ions, the diffusion layer present on its surface is selectively and preferentially corroded, and thus it has an advantage that the so-called pitting corrosion, i.e., penetration through the material can be prevented. As a result, the service life of said product is extended.

Next, a method of brazing an aluminum material according to a second aspect of the invention will be described. This method comprises a chemical conversion coating step of bringing a brazing alloy into contact with a treating solution containing potassium and fluorine to form a chemical conversion coating layer composed of $K_2AlF_5$ on the surface and a brazing step of supplying the brazing alloy subjected to the aforesaid chemical conversion coating step to a brazing desired part of an aluminum material and heating to a temperature of higher than the melting point of the brazing alloy and lower than the melting point of the aluminum material to braze the aforesaid aluminum material with each other.

According to the second aspect of this invention, since the brazing alloy having a $K_2AlF_5$ layer as a flux formed by the chemical conversion coating is used, the flux and the brazing alloy can simultaneously be provided on the brazing desired part, thus simplifying the step.

According to the second aspect of this invention, the flux may be supplied to the brazing desired part concentratedly and yet in an appropriate amount.

The second aspect of this invention is more particularly described below.

The brazing alloy in the second aspect is of the same material as described for the first aspect hereinabove, and may be in the form of a sheet, a wire or powder. The brazing alloy is varied in its amount depending on the size of the brazing part and the degree of concentration thereof, and preferabl it has a thickness of about 0.05–1 mm in the case of a sheet and a diameter of about 0.5–2 mm in the case of a wire. If the brazing alloy is powder, its particle diameter is suitably about 20–100 μm because when the $K_2AlF_5$ is coated, the ratio of the brazing alloy to $K_2AlF_5$ present becomes optimum for brazing.

The above treating solution is the same as those described for the first aspect hereinabove.

When the brazing alloy is brought into contact with the treating solution containing potassium and fluorine by e.g. immersion, on said contact site, the potassium and fluorine in the treating solution and the aluminum in the brazing alloy which is a material to be treated chemically react with each other to form a $K_2AlF_5$ layer firmly joined to the surface of said brazing alloy. In the case of a sheet-formed or wire-formed brazing alloy, said layer is preferably that covering the entire area of the brazing alloy. The amount of $K_2AlF_5$ is preferably about 2–6 g per m² of the surface area of the brazing alloy. In the case of a powdered brazing alloy, said layer may cover the entire surface area of the powder or may cover only a part thereof. In said powder, it is desired that the $K_2AlF_5$ comprises 1–10 parts by weight per 100 parts of the brazing alloy components.

As has been described above, the brazing alloy having a layer composed of the $K_2AlF_5$ is supplied to a brazing desired part and heating is conducted, thereby effecting a brazing step.

In the case of the sheet-formed brazing alloy, it is preferred to sandwich it with the aluminum material. If brazing desired part is a plurality of points on the same plane, then a sheet of such a brazing alloy may be sandwiched so as to be in contact with the plurality of brazing desired points. The thickness of the brazing alloy to be sandwiched varies depending on the size of the brazing points, their distribution conditions, etc. so that an appropriate amount of the brazing alloy be supplied to each brazing apart.

The wire-formed brazing alloy is effective for brazing a continuous brazing desired part, and in this case, it is preferably supplied along said brazing desired part.

Further, in the case of the powdered brazing alloy, it is preferably supplied to the brazing desired part by the following methods. One of the methods is carried out by applying a powdered brazing alloy either as it is or after making it into a slurry or paste with a solvent such as water, glycol etc. to a brazing desired part by coating using a brush, pallet etc. In this case, the amount of the powdered brazing alloy supplied to the brazing desired part cannot be determined uncoditionally, but if the thickness of the aluminum material is about 1 mm, it is preferably about 0.1–0.5 g per cm in length of the brazing desired part. If the aluminum material is thicker, the amount supplied is increased accordingly.

In order to make the aforesaid powdered brazing alloy in the slurry or paste form retain viscosity to some extent, an organic thickener may be added.

Another method is to add the aforesaid powdered brazing alloy having the chemical conversion coating layer composed of $K_2AlF_5$ to water to prepare a suspension and thereafter immerse a material to be brazed in said suspension, thereby depositing the aforesaid powdered brazing alloy on a brazing desired part. This method is suitable for mass production of products having a number of brazing desired parts. The aqueous suspension used in this method is suitably such that 1–2 kg of the powdered brazing alloy is added per liter of water. In this case, in order to improve the dispersibility of said powdered brazing alloy as well as the adhesion to the material to be brazed, an appropriate amount of a surface active agent may be added. Further, in order to uniformly disperse and suspend said powdered brazing alloy in the suspension at least during immersion, it is preferred to conduct suitable agitation using e.g. a stirrer, a circulating pump, etc. On the brazing desired part of a body to be brazed after immersion in the suspension, said powdered brazing alloy deposits. The brazing desired part is a part where members are combined, and on such a site, the flow resistance of the aqueous suspension is retarded and said powdered brazing alloy begins to deposit and at the same time starts to penetrate into small spaces. When said powdered brazing alloy has sufficiently penetrated, the body to be brazed is gently picked up from the aqueous suspension so that said powdered brazing alloy would not drip off. A great amount of the aqueous suspension adheres, due to surface tension, to the brazing desired part of the body to be brazed which had been picked up. Therefore, by carefully drying as it is to evaporate water, a large amount of said powdered brazing alloy deposits on the brazing desired part in addition to the aforesaid deposit.

On the other hand, the powdered brazing alloy in the aqueous suspension is decreased in amount, and accordingly, it is necessary to adjust the amount of the powdered brazing alloy to be suspended. However, since this invention uses the brazing alloy fixed with the flux, it has an advantage that the adjustment of the amount to be suspended is easy as compared with the method in which the flux and the brazing alloy are supplied separately.

Further, it is preferred to add a small amount of hydrogen fluoride or the treating solution used for the treatment of the aforesaid brazing alloy powder. In this case, since either the surface of the aluminum material is lightly roughened or $K_2AlF_5$ is formed, the deposition of said powdered brazing alloy is improved.

After the brazing alloy has been supplied to the aluminum material as described above, the brazing step similar to that in the first aspect is conducted. As a result, the brazing alloy forms a fillet on a brazing desired part, whereby a healthy brazed joint part is obtained.

In addition, the $K_2AlF_5$ in this invention has excellent properties as a flux that it has the ability to powerfully remove the oxide film on the surface of the aluminum material and yet does not react with the aluminum material. Therefore, the brazing alloy forming joint parts does not easily give rise to defects such as pinholes. Further, the flux residue is present at the brazed joint part or in its vicinity, but it is substantially insoluble in water and thus does not corrode the aluminum material. Furthermore, in place of the K in the $K_2AlF_5$ in this invention, small amounts of alkali metals such as Na, Li, Cs, Rb etc. and alkaline earth metals such as Ca may be contained as impurities.

Having generally described this invention, a further understanding can be obtained by reference to certain specific examples which are provided herein for purposes of illustration only and are not intended to be limiting unless otherwise specified.

EXAMPLE 1

As aluminum materials, pure aluminum sheets and aluminum alloy sheets of a size of 3 cm × 3 cm and a thickness of 1 mm were prepared. These sheets were immersed in treating solutions containing potassium and fluorine to provide a chemical conversion coating step in this invention, thereby 15 flux- coated aluminum materials were obtained. The names of these materials, the treating conditions etc. are given in Table 1.

Further, the X-ray diffraction pattern was observed on the surface of each material to confirm that $K_2AlF_5.H_2O$ had been formed. The X-ray diffraction pattern obtained from the aluminum material of Run No. 1 is shown in FIG. 1. Thereafter, the amounts of the $K_2AlF_5.H_2O$ deposited on the surfaces of the respective materials were examined. The amounts deposited were 0.2–10 g per m² of the material surface and their amounts deposited for the materials of the respective Run No. are shown in Table 1.

TABLE 1

| Run No. | Al material (AA) | Acid Washing with HF | Composition of Treating Solution (mole/l) | Treating Conditions Liquid Temp. Immersing Time | Drying Conditions | Weight of Chemical Conversion Coating Layer g/m² | Joint Part Evaluation |
| --- | --- | --- | --- | --- | --- | --- | --- |
| 1 | 3003 | Yes | $KHF_2$: 1 | R.T., 1 min | 100° C. Hot air | 0.2 | B |
| 2 | " | " | $KHF_2$: 0.2 | " | 100° C. Hot air | 1 | A |
| 3 | " | " | $KHF_2$: 0.1 | " | 100° C. Hot air | 2 | " |
| 4 | " | " | $KHF_2$: 0.01 | " | 100° C. Hot air | 0.3 | B |
| 5 | " | " | KF: 0.01 | " | 100° C. Hot air | 0.1 | " |
| 6 | " | " | KF: 0.1 HF: 0.05 | " | 100° C. Hot air | 3 | A |
| 7 | " | " | KF: 0.1 HF: 0.9 | " | 100° C. Hot air | 5 | " |
| 8 | " | " | KOH: 0.1 HF: 0.2 | " | 100° C. Hot air | 2 | " |
| 9 | " | " | $KHF_2$: 0.1 | R.T., 10 sec | 100° C. Hot air | 0.5 | " |
| 10 | " | No | " | 70° C., 1 sec | 100° C. Hot air | 0.5 | " |
| 11 | " | " | " | 70° C., 1 min | 100° C. Hot air | 5 | " |
| 12 | " | " | " | 70° C., 5 min | 100° C. Hot air | 10 | " |
| 13 | " | Yes | " | R.T., 1 min | Left in Atmosphere | 2 | " |
| 14 | " | " | " | " | 200° C., Hot air | 2 | " |
| 15 | 1050 | " | " | " | 100° C., Hot air | 2 | " |
| 16 | 7072 | " | " | " | 100° C., Hot air | 2 | " |
| 17 | 3003 with 4343 clad thereon | " | " | " | 100° C., Hot air | 2 | / |

Figure 2:
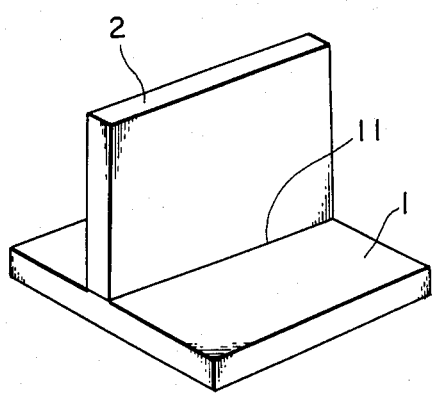

Then, using the aforesaid materials, brazing experiments were conducted. First, as shown in FIG. 2, materials 1 of Run No. 1–16 were placed horizontally and brazing sheets 2 of Run No. 17 were held thereon so that each surface be vertical, thereby 16 brazing test specimens were prepared.

Figure 3:
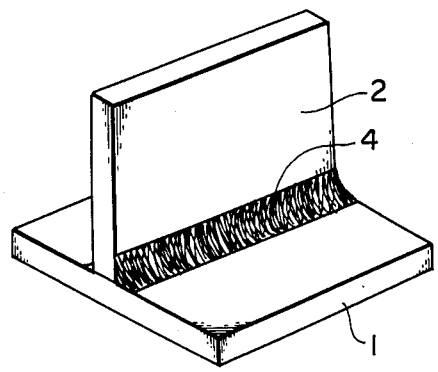
Figure 4:
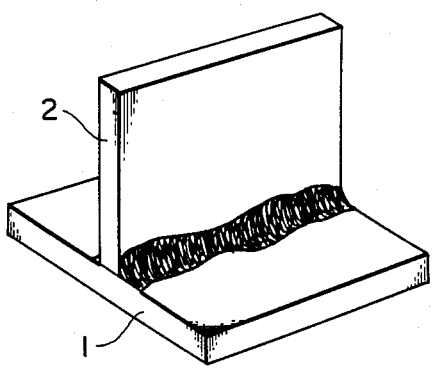

The respective brazing test specimens were placed in a brazing furnace in a nitrogen gas atmosphere, heated at 610° C. for 2 minutes, taken out of the furnace, and left to cool. Thus, a brazing part 11 of each test specimen was joined by brazing. The joint condition of each joint part was indicated as either A or B in the column under the Joint Part Evaluation in Table 1. The joint part evaluation is classified into two ranks of A and B. The states of the joint parts are shown in FIG. 3 and FIG. 4, respectively; FIG. 3 shows the case of A where the brazing alloy has uniformly penetrated, while FIG. 4 shows the case of B where there is some non-uniformity in the peneration of the brazing alloy but there is no brazing alloy lacking part.

From these results, it has been found that the brazing alloy (4343 alloy) clad on the surface of the brazing sheet 2 had been melted, flowed over the brazing part, whereby the aluminum material had been excellently joined by the brazing alloy.

EXAMPLE 2

Figure 5:
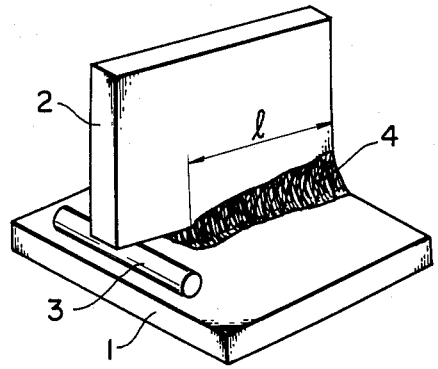

The aluminum material 1 of Run No. 11 clad with the brazing flux shown in Table 1 and the brazing sheet material 2 of Run No. 17 were combined as shown in FIG. 5, and further, by interposing a stainless steel rod 3 of 1.6 mm in diameter between both materials, brazing experiments were conducted to examine the flowability of the brazing alloy.

On the other hand, as a comparative example, a brazing test specimen was prepared by combining the aluminum material of the same kind and same size as above but not provided with the chemical conversion coating. As a brazing flux to be used for the comparative test specimen, $KAlF_4$ obtained by mixing equimolar amounts of potassium (KF) and aluminum fluoride ($AlF_3$) and heating to melt was used. A lump of this $KAlF_4$ was pulverized to a powder of about 200 mesh in particle size, and 100 g of said powder was dispersed in one liter of water, then the aforesaid comparative test specimen was immersed while stirring well, picked up and dried, whereby the aforesaid powdered flux deposited on the brazing part.

Thereafter, the aforesaid brazing test specimens were all placed in the brazing furnace used in Example 1 and heated at 610° C. for 2 minutes to effect brazing.

With the test specimens using the aluminum material subjected to the chemical conversion coating in this invention, the brazing alloy has flowed from the brazing part end to a position $l = 24 \pm 1$ mm (No. of test specimens 5), whereas with the comparative test specimens, $l = 23 \pm 2$ mm.

From these results, it can be seen that by the brazing method of this invention, the flow of the brazing alloy is facilitated, and even the brazing part where the assembled condition of the material is poor can be satisfactorily joined.

EXAMPLE 3

Two sheets of the flux coated aluminum material of Run No. 2 shown in Table 1 were assembled similarly as with the brazing test specimens in Example 1 and further a 93% Al - 7% Si wire of 1 mm in diameter as a brazing alloy was arranged along a brazing part 11. Then, they were placed in the brazing furnace used in Example 1, heated at 610° C. for 2 minutes to make the brazing alloy flow onto the brazing part, thereby forming a brazed joiht part. As a result, there was obtained, as shown in FIG. 3, a brazed joint part where the brazing alloy were uniformly distri- buted.

EXAMPLE 4

Aluminum alloy sheets of a size of 3 cm × 3 cm and a thickness of 1 mm as aluminum materials and carbon rods as counter electrodes were prepared.

On the other hand, as treating solutions, four solutions having different contents of fluorine and potassium were prepared.

These aluminum materials and counter electrodes were immersed in the respective aqueous treating solutions so that the distance between the electrodes be 3 cm, a positive voltage was applied to the aluminum materials and a negative voltage to the counter electrodes, and treatment set forth in Run No. 1–4 in Table 2 was conducted. Also, for comparison, that of Run No. 3 without application of voltage was conducted (Run No. C1).

TABLE 2

| Run No. | Composition of Treating Solution (mole/l) | Temp. of Treating Solution Treating Time | Current Density of Al Material Surface | Amount of $K_2AlF_5$ Formed |
|---|---|---|---|---|
| 1 | $KHF_2$: 0.2 | R.T., 30 sec | 1 A/dm$^2$ | 1.5 g/m$^2$ |
| 2 | $KHF_2$: 0.1 | R.T., 1 min | 0.5 A/dm$^2$ | 6 g/m$^2$ |
| 3 | $KHF_2$: 0.02 | R.T., 2 min | 1 A/dm$^2$ | 2 g/m$^2$ |
| 4 | KOH: 0.1 HF: 0.2 | R.T., 1 min | 0.5 A/dm$^2$ | 6 g/m$^2$ |
| C1 | $KHF_2$: 0.02 | R.T., 2 min | — | 0.5 g/m$^2$ |

After the above treatment, the X-ray diffraction pattern was observed on the surface of each material to confirm that $K_2AlF_5.H_2O$ had been formed. Thereafter, the amount of the $K_2Al_5.H_2O$ deposited on the surface of each material was examined. The amounts deposited were 0.5–6 g per m$^2$ of the surface area of the material, and the amounts deposited for the materials of the respective Run No. are shown in Table 2. By comparing Run No. 3 against C1, it can be seen that by applying voltage, a larger amount of $K_2AlF_5$ can be formed.

Thereafter, brazing experiments were conducted using the aforesaid materials. First, as shown in FIG. 2, materials 1 subjected to the treatment of Run No. 1–4 and C1 were placed horizontally and brazing sheets 2 of a thickness of 1 mm and a size of 3×3 cm were held thereon so that each surface be vertical, thereby 5 brazing test specimens were prepared.

The respective test specimens were placed in a brazing furnace in a nitrogen gas atmosphere, heated at 610° C. for 2 minutes, taken out of the furnace and left to cool. Thus, a brazing desired part 11 of each test specimen was joined by brazing. The brazing desired part, as shown in FIG. 3, formed an excellentfillet 4, thus excellent joint was obtained.

EXAMPLE 5

Chemical conversion coating shown as Run No. 1–4 of Table 3 was conducted by arranging aluminum materials, counter electrodes and treating solutions similar to those in Example 4 in a similar manner and by applying an alternating voltage (60 Hz) across the aluminum material and the counter electrodes. The oxide film on the aluminum material was removed, and a $K_2AlF_5$ chemical conversion coating layer was formed. The amount of the $K_2AlF_5$ formed was measured and is shown in the right end column in Table 3.

Thereafter, the aluminum materials subjected to the respective Run No. were assembled, two as a set as shown in FIG. 2, and further a 90% Al -10% Si wire of 1 mm in diameter was arranged along both sides of brazing desired parts 11.

Then, they were placed in the brazing furnace used in Example 4, heated at 610° C. for 2 minutes to make the brazing alloy flow onto the brazing parts; thereby forming brazed joint parts. As a result, as shown in FIG. 3, there were obtained brazed joint parts in which barzing alloy was uniformly distributed.

TABLE 3

| Run No. | Composition of Treating Solution (mole/l) | Temp. of Treating Solution Treating Time | Voltage Applied | Amount of $K_2AlF_5$ Formed |
| --- | --- | --- | --- | --- |
| 1 | $KHF_2$: 0.2 | R.T., 1 min | 20 V | 2 g/m$^2$ |
| 2 | $KHF_2$: 0.1 | " | 10 V | 7 g/m$^2$ |
| 3 | $KHF_2$: 0.02 | " | 10 V | 2 g/m$^2$ |
| 4 | KOH: 0.1<br>HF: 0.2 | R.T., 30 sec | 10 V | 4 g/m$^2$ |

EXAMPLE 6

A number of sheets of a size of 3 cm×3 cm and a thickness of 1 mm were prepared as aluminum materials, and these sheets were immersed in treating solutions containing potassium, fluorine and zinc to conduct a chemical conversion coating step in this invention.

The names of these materials, the treating solutions, the treating conditions etc. are shown in Table 4. Further, the X-ray diffraction pattern on the surface of each material was observed to confirm that $K_2AlF_5.H_2O$ and zinc had been formed.

TABLE 4

| Run No. | Al Material (AA) | Composition of Treating Solution (mole/l) | Temp. of Treating Solution (°C) | Immersing Time (min) | Zn Concentration on Surface (wt %) | Thickness of Zinc Diffusion Layer (μm) |
| --- | --- | --- | --- | --- | --- | --- |
| 1 | 3003 | $KHF_2$: 0.1<br>HF: 0.2<br>ZnO: 0.1 | 20 | 5 | 1.9 | 85 |
| 2 | " | $KHF_2$: 0.1<br>HF: 0.2<br>ZnO: 0.1 | 40 | 2 | 4.5 | 100 |
| 3 | " | $KHF_2$: 0.1<br>HF: 0.2<br>ZnO: 0.1 | 60 | 5 | 8.1 | 110 |
| 4 | 1050 | $KHF_2$: 0.1<br>$ZNF_2$: 0.08 | 70 | 1 | 6.5 | 110 |
| 5 | " | KOH: 0.1<br>HF: 0.4<br>ZnO: 0.1 | 40 | " | 1.9 | 90 |
| 6 | " | KOH: 0.1<br>HF: 0.4<br>ZnO: 0.1 | 60 | " | 5.9 | " |
| 7 | 3003 | KF: 1.0<br>HF: 7.0<br>$ZnF_2$: 0.9 | 20 | " | 2.0 | " |
| 8 | " | HF: 1.0<br>KF: 0.15<br>$ZnF_2$: 0.5 | 20 | " | 1.7 | " |
| 9 | " | $KHF_2$: 0.9<br>$ZnF_2$: 0.09 | 70 | " | 2.5 | 110 |
| 10 | " | $KHF_2$: 0.01<br>$ZnF_2$: 0.01 | 70 | 2 | 1.0 | 70 |
| 11 | " | KOH: 0.5<br>HF: 0.8<br>ZnO: 0.8 | 40 | 1 | 3.0 | 110 |
| 12 | " | KOH: 0.009<br>HF: 0.015<br>ZnO: 0.02 | 70 | 2 | 0.9 | 70 |
| 13 | 3003 with 3434 clad thereon | $KHF_2$: 0.1<br>$ZnH_2$: 0.08 | 20 | 5 | 1.0 | 70 |

Thereafter, using the above respective materials, brazing experiments were conducted. First, materials 1 of Run No. 1-12 in Table 4 were placed horizontally and brazing sheets 2 of Run No. 13 were fixed thereon as shown in FIG. 2 so that each surface be vertical, thereby 12 different brazing test specimens were prepared. The respective brazing test specimens were placed in a brazing furnace in a nitrogen atmosphere, and heated at 620° C. for 2 minutes to effect a brazing step. As the result of brazing, a beautiful fillet 2 as shown in FIG. 3 was formed on each brazig desired part 11. Further, zinc diffusion layers were formed on the surfaces of the respective brazing test specimen materials 1 and 2, and the concentration of zinc in the each diffusion layer and the thickness of the diffusion layer were measured. The results are shown in Table 4.

On the other hand, a brazing test specimen similar to the above was prepared, and a corrosion test was effected by spraying a 3 wt% aqueous solution of sodium chloride. As a result, although the zinc diffusion layer was corroded, there was no corrosion penetrating through the aluminum material. That is, it has been found that the aforesaid diffusion layer acts as a pitting corrosion inhibiting layer.

EXAMPLE 7

An aluminum material (3003 alloy) having the same size as those used in Example 6 was subjected to a chemical conversion coating step under the conditions of Run No. 1-3 and, as Comparative Example, C1 in Table 5.

TABLE 5

| Run No. | Composition of Treating Solution (mole/l) | Temp. of Treating Solution (°C.) | Immersing Time (min) | Fillet Length l (mm) |
|---|---|---|---|---|
| 1 | KHF$_2$: 0.1<br>ZnF$_2$·4H$_2$O: 0.1 | 20 | 1 | 27 ± 0.5 |
| 2 | KHF$_2$: 0.1<br>HF: 0.2<br>ZnO: 0.01 | 20 | 1 | 25 ± 0.5 |
| 3 | KF: 1<br>HF: 3<br>ZnF$_2$: 0.78 | 20 | 1 | 24 ± 0.5 |
| C1 | KHF$_2$: 0.1 | 20 | 1 | 22 ± 1 |

Thereafter, these sheets of the aluminum material were placed horizontally, brazing sheets provided with the treatment of Run No. 13 in Example 6 were fixed thereon so that each surface be vertical, and at the same time, as shown in FIG. 5, stainless steel rods of 1.6 mm in diameter were each interposed between both materials, and these three members were fixed to prepare each brazing test specimen. Then, these test specimens were subjected to a brazing step under conditions similar to those in Example 6 to form brazed joint parts. After brazing, in order to compare the flowability of the brazing alloy on the respective test specimens, the length l of the fillet 4 of the brazing alloy was measured. The results are shown in Table 5.

As evident from these results, it can be seen that with those having the coating layer with the zinc deposited thereon, the fillet length l of the brazing alloy is longer, that is, the flowability of the brazing alloy is better, than in the case where zinc was not used, and the brazing alloy has penetrated into the brazing desired part having a large space, thus enabling the brazing.

EXAMPLE 8

One mole of aluminum hydroxide (Al(OH)$_3$) was dissolved per liter of a hydrogen fluoride aqueous solution having a concentration of 4 N, and the hydrogen ion concentration (pH) was adjusted to 3–7 by adding thereto an aqueous solution of potassium hydroxide (KOH) having a concentration of 10 N, on which time, the aqueous solution became turbid and gave a slurry. Said slurry was dried to obtain a powder mainly composed of K$_2$AlF$_5$ fine particles.

On the other hand, an aluminum material 1 (3003 alloy) of a thickness of 1 mm and a size of 3 cm × 3 cm and AA 3003 alloy clad on both sides with AA 4343 alloy, i.e. the so-called brazing sheet 2 of the same dimention as above were prepared, and they were combined in a T-shape as shown in FIG. 2 to prepare a brazing test specimen having a brazing desired part 11.

On the other hand, one liter of an aqueous solution containing 0.2 mole/l of potassium hydrogenfluoride (KHF$_2$) was prepared, 20 g of the aforesaid K$_2$AlF$_5$ powder was added thereto and stirred to prepare a treating solution.

The aforesaid brazing test specimen was immersed in said treating solution and picked up. The surface of the test specimen had a white tinge, and the treating solution uniformly remained on the brazing desired part. It was dried and heated in a brazing furnace in a nitrogen atmosphere at 620° C. for 2 minutes. After cooled inside the furnace to some extent the brazing test specimen was taken out of the brazing furnace, and the brazing desired part was observed. As a result, as shown in FIG. 3, the 4343 alloy had flowed off from the brazing sheet as a brazing alloy, uniformly penetrated through the brazing desired part and formed an excellent fillet part 4 and at the same time firmly joined the aluminum alloy sheet 1 and the brazing sheet 2. It has been found that the K$_2$AlF$_5$ acts effectively as a brazing flux for the aluminum material. Moreover, when the aforesaid brazing test specimen was maintained in a highly humid atmosphere for a prolonged time, corrosion by the flux was not observed.

EXAMPLE 9

In a manner similar to that in Example 8, a K$_2$AlF$_5$ powder was obtained. Further, an aqueous solution containing 1 mole/l of potassium fluoride (KF), 3 mole/l of hydrogen fluoride (HF) and 0.8 mole/l of zinc fluoride dissolved therein was prepared, and the aforesaid K$_2$AlF$_5$ powder was added thereto and stirred well to prepare a treating solution.

On the other hand, as a body to be brazed, there was prepared a body to be brazed which was an assembly of aluminum alloy members for producing a heat exchanger for an air-conditioner to be used in an automobile. Said heat exchanger was such type that a refrigerant passes through a tube and accordingly cools a fin brazed to the tube, whereby the air passing around the fin is also cooled. Said tube and fin were produced by molding 3003 alloy and a brazing sheet respectively.

Said body to be brazed was immersed in the aforesaid treating solution for a minute, picked up and dried. On the surface of the body to be brazed was formed a coating layer in which the metallic zinc and K$_2$AlF$_5$ powder was minutely intermingled and at the same time the K$_2$AlF$_5$ powder was uniformly adhered, and further, on the contact part of the fin and the tube, a large amount of the K$_2$AlF$_5$ powder deposited.

Thereafter, a brazing step was effected by heating in a brazing furnace larger than that used in Example 8 in a nitrogen atmosphere at 620° C. for 5 minutes.

As a result, the brazing alloy penetrated into about 5000 sites of brazing desired parts, thus forming excellent brazed joint parts, and at the same time, a zinc diffusion layer to act as a pitting corrosion inhibiting layer was formed on the surface.

A 3 wt% aqueous solution of sodium chloride was sprayed on the heat exchanger subjected to the brazing step to conduct an accelerated corrosion test. As a result, the zinc diffusion layer was corroded but did not lead to pitting corrosion. As a comparative example, a heat exchanger of a similar material was treated with a treating solution similar to that prepared in Example 8 and, after effecting brazing, a similar corrosion test was simultaneously conducted. This heat exchanger showed generation of pitting corrosion from the surface to the inside.

EXAMPLE 10

Sheets of an aluminum material 1 (3003 alloy) of a size of 2 cm × 3 cm and a thickness of 1 mm and brazing sheets 2 (clad alloy: 4343; core alloy: 3003) of a size of 1.5 cm × 3 cm and a thickness of 1.6 mm were prepared. These brazing sheets were combined as shown in FIG. 5, stainless steel rods of 1.6 mm in diameter were each interposed between both materials, these sets of three were fixed, and were subjected to a chemical conversion coating step under the conditions given as Run No. 1, 2 and, as comparative examples, C1 and C2 in Table 6, thereby brazing test specimens were prepared. The AlF$_3$ used in Run No. 1 and 2 was that of a particle size of 350 mesh. The respective brazing test specimens were placed in a brazing furnace in a nitrogen gas atmosphere, and heated at 620° C. for 2 minutes to effect a brazing step. After brazing, in order to compare the flowability of the brazing alloy in the respective test specimens, the fillet length l of each brazing alloy was measured. As evident from these results, the fillet length l of the brazing alloy is longer with those having the coating layer formed by the chemical conversion coating and containing the AlF$_3$ as compared with the case where the AlF$_3$ was not added. That is, since it is possible to make the AlF$_3$ as well as the K$_2$AlF$_5$ deposit on the brazing desired part, the flow of the brazing alloy is improved.

TABLE 6

| Run No. | Composition of Treating Solution | Temp. of Treating Solution (°C.) | Immersing Time (sec) | Amount of Flux (g/m$^2$) | Fillet Length l (mm) |
| --- | --- | --- | --- | --- | --- |
| 1 | KHF$_2$: 0.1 (mole/l) AlF$_2$: 10 (g/l) | 25 | 15 | 1.2 | 23 ± 0.8 |
| C1 | KHF$_2$: 0.1 (mole/l) | 25 | 15 | 1.0 | 19 ± 1 |
| 2 | KHF$_2$: 0.1 (mole/l) ZnO: 0.05 (mole/l) HF: 0.2 (mole/l) AlF$_3$: 10 (g/l) | 25 | 10 | 1.2 | 22 ± 0.5 |
| C2 | KHF$_2$: 0.1 (mole/l) ZnO: 0.05 (mole/l) HF: 0.2 (mole/l) | 25 | 10 | 1.0 | 20 ± 0.5 |

EXAMPLE 11

Two bands of an Al - 7% Si alloy of 30 mm wide, 100 mm long and 0.1 mm thick were prepared to make sheet-formed brazing alloys 30.

Thereafter, a treating solution of 0.2 mole of KHF$_2$ dissolved in one liter of ion exchanged water was prepared, and the aforesaid sheet-formed brazing alloys were immersed therein to form a K$_2$AlF$_5$ coating layer on each brazing alloy surface.

Figure 6:
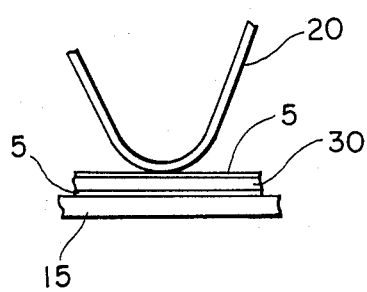
Figure 7:
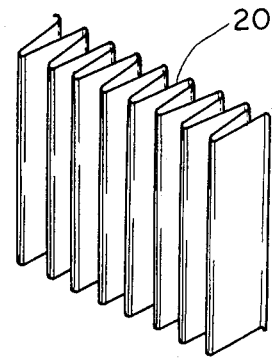
Figure 8:
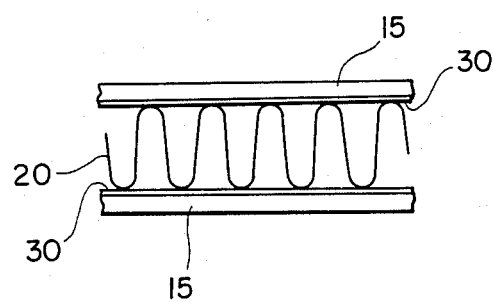

On the other hand, 2 aluminum alloy sheets 15 of AA 3003 alloy of a size of 30 mm × 100 mm and a thickness of 1 mm, and also an aluminum alloy corrugated sheet 20 made from an aluminum alloy band of the same material and 30 mm wide and 0.1 mm thick by bending as shown in FIG. 7 were prepared. Thereafter, the sheet-formed brazing alloys 30, the alluminum alloy sheets 15 and the aluminum alloy corrugated sheet 20 were preassembled as shown in FIG. 8. The sheet-formed brazing alloys 30 were flexibly sandwiched by the aluminum alloy sheets 15 and the the aluminum alloy corrugated sheet 20 and, as shown in FIG. 6, the K$_2$AlF$_5$ coating layers 5 formed on the top and rear surfaces of the sheet-formed brazing alloys 30 were in contact with the surface of the aluminum alloy sheet 15 and the surface of the aluminum alloy corrugated sheet 20 respectively.

The aforesaid preassembly was placed in a brazing furnace in a nitrogen gas atmosphere, maintained at 620° C. for 2 minutes and then cooled. As a result, all the brazing desired parts were given excellent fillets, and thus joining by brazing was effected under good conditions.

EXAMPLE 12

One kg of a 93 wt% Al - 7 wt% Si eutectic alloy powder (average particle diameter of ca. 50 μm) as a brazing alloy and one liter of an aqueous solution of 0.2 mole of KHF$_2$ dissolved therein as a chemical conversion coating agent were prepared, and said powder was added to said aqueous solution in portions to subject said powder to the chemical conversion coating. It was left as it is for about 10 minutes, said powder was recovered from the aqueous solution by filtration, and the X-ray diffraction pattern was observed in order to identify the white substance present on the surface. As a result, the white substance was found to be potassium pentafluoroaluminate of the chemical formula: K$_2$AlF$_5$.H$_2$0. Thus, a powdered brazing alloy having a layer composed of the K$_2$AlF$_5$ in this invention was obtained. Said powdered brazing alloy was added to one liter of water to prepare a suspension in this invention.

Figure 9:
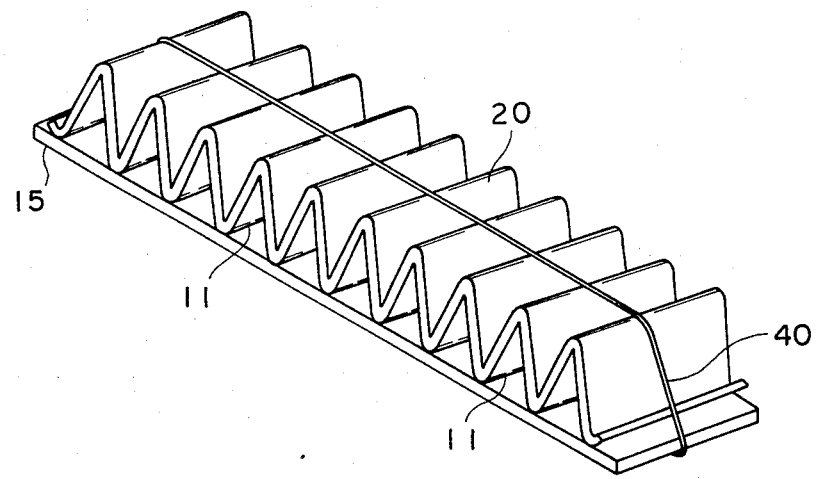

On the other hand, as shown in FIG. 9, a body to be brazed was prepared. This body to be brazed was made from an aluminum alloy (AA 3003 alloy) sheet 15 of a size of 5 cm × 10 cm and a thickness of 1 mm, an aluminum alloy (same material) corrugated sheet 20 of a size of 5 cm × 40 cm mounted on the aluminum alloy sheet 15 and a nichrome wire 40 binding both.

This body to be brazed was immersed in the aforesaid suspension. At that time, good agitation was effected using a stirrer so as to prevent the powdered brazing alloy from settling in the suspension.

After immersion for 1-2 minutes, the body to be brazed was gently picked up and gently dried with hot air. The powdered brazing alloy deposited relatively concentratedly on eleven brazing desired parts of said body to be brazed. Thereafter, said body to be brazed was placed in a brazing furnace, and subjected to a brazing step of maintaining at 620° C. for 2 minutes. As a result, beautiful fillets were formed on all the brazing desired parts and thus joining by brazing was effected under good conditions.

EXAMPLE 13

A powdered brazing alloy of an average particle diameter of about 20 μm was produced in a manner similar to that in Example 12.

Further, aluminum alloy ( AA 1050 alloy) sheets 1 and 2 of a size of 5 cm × 5 cm and a thickness of 3 mm were prepared, and combined into a T-shape as shown in FIG. 2 to give a body to be brazed. The combined part of the aforesaid aluminum alloy sheets was made a brazing desired part 11, and the aforesaid powdered brazing alloy was supplied from both sides of the brazing desired part along the sides thereof at a rate of 0.2 g per cm of one side of the brazing desired part.

When a brazing step was applied to said body to be brazed in a manner similar to that in Example 12, a beautiful fillet 4 was formed on the brazing desired part, and thus it was possible to effect excellent brazing as shown in FIG. 3.

What is claimed is:

1. A method of brazing an aluminum material which comprises: a chemical conversion coating step of bringing at least a brazing desired part of the aluminum material into contact with a treating solution containing potassium and fluorine ions to form a brazing flux layer composed of potassium pentafluoroaluminate on the surface of said aluminum material; and a brazing step of heating at least the flux layer formed part to a temperature of lower than the melting point of the aluminum material and higher than the melting point of a brazing alloy to join said aluminum material to a counterpart material with said brazing alloy.

2. The method of brazing according to claim 1, wherein said contact is effected by immersion.

3. The method of brazing according to claim 2, wherein said treating solution is an aqueous solution containing 0.01–1 mole/l of the potassium ions and the fluorine ions at a molar ratio to the potassium ions of 1–10.

4. The method of brazing according to claim 1, wherein said treating solution further contains zinc ions.

5. The method of brazing according to claim 4, wherein said treating solution is an aqueous solution containing 0.01–1 mole/l of the potassium ions, the fluorine ions at a molar ratio to the potassium ions of 1–10 and 0.01–0.16 mole/l of the zinc ions.

6. The method of brazing according to claim 1, wherein said treating solution further contains a potassium pentafluoroaluminate powder suspended therein.

7. The method of brazing according to claim 4, wherein said treating solution further contains a potassium pentafluoroaluminate powder suspended therein.

8. The method of brazing according to claim 1, wherein said treating solution further contains an aluminum fluoride powder suspended therein.

9. The method of brazing according to claim 4, wherein said treating solution further contains an aluminum fluoride powder suspended therein.

10. The method of brazing according to claim 1, wherein said aluminum material is a brazing sheet.

11. The method of brazing according to claim 2, wherein said chemical conversion coating step is effected in an electric field.

12. The method of brazing according to claim 4, wherein said aluminum material is an assembly.

13. The method of brazing according to claim 8, wherein said aluminum material is an assembly.

14. The method of brazing according to claim 9, wherein said aluminum material is an assembly.

15. The method of brazing according to claim 3, wherein said treating solution is an aqueous solution of $KHF_2$.

16. The method of brazing according to claim 3, wherein said treating solution is an aqueous solution of KF and HF.

17. The method of brazing according to claim 5, wherein said contact is effected by immersion and said treating solution is an aqueous solution of $KHF_2$ and $ZnF_2$.

18. The method of brazing according to claim 5, wherein said contact is effected by immersion and said treating solution is an aqueous solution of KF, HF and $ZnF_2$.

19. The method of brazing according to claim 5, wherein said contact is effected by immersion and said aluminum material is an assembly.

20. The method of brazing an aluminum material which comprises: a chemical conversion coating step of bringing an aluminum brazing alloy into contact with a treating solution containing potassium and fluorine ions to form a flux layer composed of $K_2AlF_5$ on the surface of said brazing alloy; and a brazing step of supplying the brazing alloy subjected to said chemical conversion coating step to a brazing desired part of the aluminum material and heating to a temperature of higher than the melting point of the brazing alloy and lower than the melting point of the aluminum material to braze said aluminum material to a counterpart material.

21. The method of brazing according to claim 20, wherein said contact is effected by immersion.

22. The method of brazing according to claim 20, wherein said brazing alloy is in form of a sheet and the supply of the brazing alloy to the aluminum material is effected by sandwiching with the aluminum material.

23. The method of brazing according to claim 20, wherein said brazing alloy is in form of powder.

24. The method of brazing according to claim 23, wherein the supply of said brazing alloy is effected by immersing the aluminum material in a suspension of the brazing alloy powder.

25. The method of brazing according to claim 22, wherein said treating solution is an aqueous solution containing 0.01–1 mole/l of the potassium ions and the fluorine ions at a molar ratio to the potassium ions of 1–10.

26. The method of brazing according to claim 23, wherein said treating solution is an aqueous solution containing 0.01–1 mole/l of the potassium ions and the fluorine ions at a molar ratio to the potassium ions of 1–10.

27. The method of brazing according to claim 22, wherein said treating solution is an aqueous solution of $KHF_2$.

28. The method of brazing according to claim 22, wherein said treating solution is an aqueous solution of KF and HF.

29. The method of brazing according to claim 26, wherein said treating solution is an aqueous solution of $KHF_2$.

30. A method of brazing an aluminum material which comprises:
(a) contacting at least part of the aluminum material with a treating solution which forms a brazing flux layer of potassium pentafluoroaluminate on the part so contacted, and
(b) heating said part to a temperature which is lower than the melting point of the aluminum material and higher than the melting point of a brazing alloy used to join said aluminum material to a counterpart material.

31. A method according to claim 30 wherein the treating solution forms the brazing flux layer by reaction with aluminum of said aluminum material.

32. In a method of brazing an aluminum material with a brazing flux, the improvement wherein the brazing flux is substantially composed of potassium pentafluoroaluminate.

* * * * *